(12) United States Patent
Wu et al.

(10) Patent No.: US 11,956,737 B2
(45) Date of Patent: Apr. 9, 2024

(54) POWER ADJUSTMENT METHOD AND APPARATUS FOR UNLICENSED SPECTRUM

(71) Applicant: GUANGDONG OPPO MOBILE TELECOMMUNICATIONS CORP., LTD., Guangdong (CN)

(72) Inventors: Zuomin Wu, Guangdong (CN); Rongyi Hu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 331 days.

(21) Appl. No.: 17/510,361

(22) Filed: Oct. 25, 2021

(65) Prior Publication Data
US 2022/0046559 A1 Feb. 10, 2022

Related U.S. Application Data (63) Continuation of application No. PCT/CN2019/085385, filed on Apr. 30, 2019.

(51) Int. Cl.
*H04W 52/38* (2009.01)
*H04L 5/00* (2006.01)
*H04W 72/0446* (2023.01)
*H04W 74/0808* (2024.01)

(52) U.S. Cl.
CPC ........... *H04W 52/38* (2013.01); *H04L 5/0048* (2013.01); *H04W 72/0446* (2013.01); *H04W 74/0808* (2013.01)

(58) Field of Classification Search
None
See application file for complete search history.

(56) References Cited

U.S. PATENT DOCUMENTS

| | | | | |
|---|---|---|---|---|
| 2019/0230707 A1* | 7/2019 | Bergljung | ............. | H04L 5/0073 |
| 2020/0275492 A1* | 8/2020 | Lei | ........................ | H04L 5/0053 |

FOREIGN PATENT DOCUMENTS

| | | |
|---|---|---|
| CN | 107690181 | 2/2018 |
| WO | 2017160131 | 9/2017 |

OTHER PUBLICATIONS

OPPO, "Discussion on dynamic transient period location for NR," 3GPP TSG-RAN WG4 Meeting #88, R4-1810408, Aug. 2018, 5 pages.
Qualcomm et al., "WF for dynamic transient period location for NR," 3GPP TSG-RAN4 Meeting #87, R4-1808112, May 2018, 10 pages.
ZTE Corporation, "Further analysis on UE On/Off time mask for sTTI," 3GPP TSG-RAN WG4 Meeting #82bis, R4-1702795, Apr. 2017, 5 pages.

(Continued)

*Primary Examiner* — Christine T Duong
(74) *Attorney, Agent, or Firm* — Hodgson Russ LLP (57) ABSTRACT

Provided are a power adjustment method and apparatus for an unlicensed spectrum, and a terminal device and a network device. The method comprises: a terminal device adjusting, in a first transition period, a transmission power from turning-off to turning-on for a target transmission, wherein the first transition period and a first gap at least partially overlap in a time domain, the first gap comprises the length of time between an end moment of a first transmission and a start moment of the target transmission, and the first transmission is the most recent transmission before the target transmission.

14 Claims, 5 Drawing Sheets

(56) References Cited

OTHER PUBLICATIONS

NEC, "TP for TR BS RF on Transmit On/Off power for TDD NR BS," 3GPP TSG-RAN WG4 Meeting NR ad-hoc #3, R4-1709815, Sep. 2017, 4 pages.
"3rd Generation Partnership Project; Technical Specification Group Radio Access Network; Evolved Universal Terrestrial Radio Access (E-UTRA); Physical channels and modulation (Release 15)," 3GPP TS 36.211, Dec. 2019, v15.8.0, 238 pages.
"3rd Generation Partnership Project; Technical Specification Group Radio Access Network; Evolved Universal Terrestrial Radio Access (E-UTRA); Multiplexing and channel coding (Release 15)," 3GPP TS 36.212, Dec. 2019, v15.8.0, 240 pages.
WIPO, International Search Report and Written Opinion for PCT/CN2019/085385, dated Jan. 9, 2020.

\* cited by examiner

Terminal device adjusts a transmission power from off to on for a target transmission within a first transient period, where the first transient period and a first gap are at least partially overlapped in time domain, the first gap includes a time length between an end timing of a first transmission and a start timing of the target transmission, and the first transmission is a latest transmission before the target transmission — 301

Network device adjusts a transmission power from off to on for a target downlink transmission within a first transient period, where the first transient period and a first gap are at least partially overlapped in time domain, the first gap includes a time length between an end timing of a first transmission and a start timing of the target downlink transmission, and the first transmission is a latest transmission before the target downlink transmission — 501

POWER ADJUSTMENT METHOD AND APPARATUS FOR UNLICENSED SPECTRUM

CROSS-REFERENCE TO RELATED APPLICATION

This application is a continuation of International Application No. PCT/CN2019/085385, filed Apr. 30, 2019, the entire disclosure of which is incorporated herein by reference.

TECHNICAL FIELD

The embodiments of the present application relate to the field of mobile communication technology, and more particularly, to a power adjustment method and apparatus for an unlicensed spectrum, a terminal device and a network device.

BACKGROUND

A time mask is used to determine a transient period for transmission power adjustment. Symbols or sub-slots occupied by the transient period may lead to a relatively high demodulation error rate due to an unstable power, and therefore a transmission is generally not required within the transient period.

A communication device on an unlicensed spectrum needs to perform Listen Before Talk (LBT) before transmission in order to obtain an uplink transmission opportunity (UL burst) or a downlink transmission opportunity (DL burst). In one situation, the communication device may directly perform an uplink transmission or a downlink transmission without LBT. A new time mask scheme is required for the uplink transmission or the downlink transmission in this situation.

SUMMARY

Embodiments of the present application provide a power adjustment method and apparatus for an unlicensed spectrum, a terminal device and a network device.

A power adjustment method for an unlicensed spectrum provided by an embodiment of the present application includes:

adjusting, by a terminal device, a transmission power from off to on for a target transmission within a first transient period, where the first transient period and a first gap are at least partially overlapped in time domain, the first gap includes a time length between an end timing of a first transmission and a start timing of the target transmission, and the first transmission is a latest transmission before the target transmission.

A power adjustment method for an unlicensed spectrum provided by an embodiment of the present application includes:

adjusting, by a network device, a transmission power from off to on for a target downlink transmission within a first transient period, where the first transient period and a first gap are at least partially overlapped in time domain, the first gap includes a time length between an end timing of a first transmission and a start timing of the target downlink transmission, and the first transmission is a latest transmission before the target downlink transmission.

A power adjustment apparatus for an unlicensed spectrum provided by an embodiment of the present application, which is applied to a terminal device, includes:

a power adjustment unit, configured to adjust a transmission power from off to on for a target transmission within a first transient period, where the first transient period and a first gap are at least partially overlapped in time domain, the first gap includes a time length between an end timing of a first transmission and a start timing of the target transmission, and the first transmission is a latest transmission before the target transmission.

A power adjustment apparatus for an unlicensed spectrum provided by an embodiment of the present application, which is applied to a network device, includes:

a power adjustment unit, configured to adjust a transmission power from off to on for a target downlink transmission within a first transient period, where the first transient period and a first gap are at least partially overlapped in time domain, the first gap includes a time length between an end timing of a first transmission and a start timing of the target downlink transmission, and the first transmission is a latest transmission before the target downlink transmission.

A terminal device provided by an embodiment of the present application includes a processor and a memory. The memory is configured to store a computer program, and the processor is configured to call and run the computer program stored in the memory to perform the power adjustment method for the unlicensed spectrum described above.

A network device provided by an embodiment of the present application includes a processor and a memory. The memory is configured to store a computer program, and the processor is configured to call and run the computer program stored in the memory to perform the power adjustment method for the unlicensed spectrum described above.

A chip provided by an embodiment of the present application is configured to perform the power adjustment method for the unlicensed spectrum described above.

Specifically, the chip includes: a processor, configured to call and run a computer program from a memory, so that a device installed with the chip performs the power adjustment method for the unlicensed spectrum described above.

A computer-readable storage medium provided by an embodiment of the present application is configured to store a computer program that causes a computer to perform the power adjustment method for the unlicensed spectrum described above.

A computer program product provided by an embodiment of the present application includes a computer program instruction that causes a computer to perform the power adjustment method for the unlicensed spectrum described above.

A computer program provided by an embodiment of the present application, when running on a computer, causes the computer to perform the power adjustment method for the unlicensed spectrum described above.

In a New Radio-Unlicensed (NR-U) system, in the case that a terminal device or a network device directly performs a target transmission without LBT, technical solutions of the embodiments of the present application flexibly design transient periods (i.e., time mask) under different conditions, according to the size of the gap between the target transmission and the latest transmission as well as index requirements of the target transmission, to achieve the following beneficial effects: to realize flexible turning off powers of different unlicensed devices (the terminal device and the network device); to reduce the impact of the transient period on actual transmitted symbols, and improve transmission reliability and decoding success rate; and to ensure the time mask off time transient performance of the terminal device or the network device.

BRIEF DESCRIPTION OF THE DRAWINGS

The drawings described herein are used to provide a further understanding of the present application and constitute a part of the present application. The exemplary embodiments and descriptions thereof are used to explain the present application, and do not constitute an improper limitation of the present application. In the drawings.

DETAILED DESCRIPTION

The technical solutions in the embodiments of the present application will be described below in conjunction with the drawings in the embodiments of the present application. Obviously, the described embodiments are part of the embodiments of the present application, rather than all of them. Based on the embodiments in the present application, all the other embodiments obtained by those of ordinary skill in the art without creative work fall within the protection scope of the present application.

The technical solution of the embodiments of the present application can be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD), an Advanced Long Term Evolution (LTE-A) system, a New Radio (NR) system, an evolution system of an NR system, an LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, a Wireless Local Area Network (WLAN), Wireless Fidelity (WiFi), a next-generation communication system or another communication system, etc.

Generally speaking, traditional communication systems support a limited number of connections and are easy to implement. However, with the development of communication technology, mobile communication systems will not only support traditional communication, but also support, for example, Device to Device (D2D) communication, Machine to Machine (M2M) communication, Machine Type Communication (MTC) communication, and Vehicle to Vehicle (V2V) communication, etc. The embodiments of the present application can also be applied to these communication systems.

Figure 1:
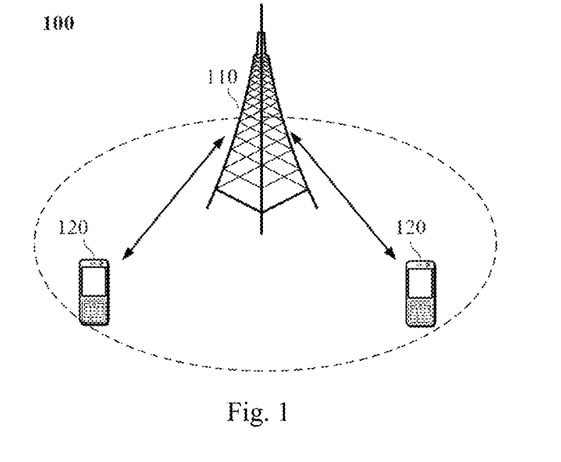
FIG. 1 is a schematic diagram of a communication system architecture provided by an embodiment of the present application.

Exemplarily, a communication system 100 applied in the embodiments of the present application is shown in FIG. 1. The communication system 100 may include a network device 110, which may be a device that communicates with a terminal device 120 (or referred as a communication terminal or a terminal). The network device 110 may provide communication coverage for a specific geographic area, and may communicate with the terminal device located within the coverage area. Optionally, the network device 110 may be a Base Transceiver Station (BTS) in a GSM system or a CDMA system, or may also be a Node B (NB) in a WCDMA system, or may also be an evolutional Node B (eNB or NodeB) in an LTE system, or a wireless controller in a Cloud Radio Access Network (CRAN), or the network device may be a mobile switching center, a relay station, an access point, an in-vehicle device, a wearable device, a hub, a switch, a network bridge, a router, a network side device in a 5G network or a network device in a future evolved Public Land Mobile Network (PLMN), etc.

The communication system 100 also includes at least one terminal device 120 located within the coverage area of the network device 110. As used herein, the "terminal device" includes, but is not limited to, a device that is configured to receive/send communication signals via a wired line connection, such as via a Public Switched Telephone Network (PSTN), a Digital Subscriber Line (DSL), a digital cable, a direct cable connection; and/or another data connection/network; and/or via a wireless interface for, for example, a cellular network, a Wireless Local Area Network (WLAN), a digital TV network such as a DVB-H network, a satellite network and an AF-FM broadcast transmitter; and/or another terminal device; and/or an Internet of Things (IoT) device. The terminal device configured to communicate via a wireless interface may be referred to as a "wireless communication terminal", a "wireless terminal" or a "mobile terminal". Examples of mobile terminals include, but are not limited to, a satellite or cellular phone; a Personal Communications System (PCS) system that may combine a cellular wireless phone with data processing, fax and data communication capabilities; a PDA that may include a radio phone, a pager, an Internet/intranet access, a Web browser, a memo pad, a calendar, and/or a Global Positioning System (GPS) receiver; and a conventional laptop and/or a palmtop receiver or other electric apparatus including a radiophone transceiver. The terminal device may refer to an access terminal, a User Equipment (UE), a subscriber unit, a subscriber station, a mobile station, a mobile console, a remote station, a remote terminal, a mobile device, a user terminal, a terminal, a wireless communication device, a user agent or a user apparatus. The access terminal may be a cellular phone, a cordless phone, a Session Initiation Protocol (SIP) phone, a Wireless Local Loop (WLL) station, a personal digital assistant (PDA), a handheld device with wireless communication function, a computing device or another processing device connected to a wireless modem, an in-vehicle device, a wearable device, a terminal device in a 5G network or a terminal device in the future evolved PLMN, etc.

Optionally, the terminal devices 120 may perform Device to Device (D2D) communication with each other.

Optionally, a 5G system or 5G network may also be referred as a New Radio (NR) system or NR network.

FIG. 1 exemplarily illustrates one network device and two terminal devices. Optionally, the communication system 100 may include a plurality of network devices, and the coverage area of each network device may include other numbers of terminal devices, which is not limited by the embodiment of the present application.

Optionally, the communication system 100 may further include other network entities such as a network controller, a mobile management entity, etc., which is not limited by the embodiment of the present application.

It should be understood that a device with a communication function in a network/system in the embodiments of the present application can be referred to as a communication device. Taking the communication system 100 shown in FIG. 1 as an example, the communication device may include a network device 110 and a terminal device 120 with the communication function, and the network device 110 and the terminal device 120 may be the specific devices described above, which will not be elaborated here; and the communication device may further include other devices in the communication system 100, for example, other network entities such as a network controller, a mobile management entity, etc., which is not limited by the embodiment of the present application.

It should be understood that terms "system" and "network" are often used interchangeably herein. The term "and/or" herein is only an association relationship for describing the associated objects, and means that there may be three kinds of relationships. For example, A and/or B may mean that there are the following three cases: A exists alone, A and B exist at the same time, and B exists alone. In addition, the character "/" herein generally indicates that the associated objects are in an "or" relationship.

In order to facilitate the understanding of the technical solutions in the embodiments of the present application, the related technologies of the embodiments of the present application are described below. The following related technologies as optional solutions can be arbitrarily combined with the technical solutions in the embodiments of the present application, all of which belong to the protection scope of the embodiments of the application.

An unlicensed spectrum is a spectrum that can be used for communication of a radio device and that is allocated by countries and regions. This spectrum may be generally considered as a shared spectrum. That is, as long as communication devices in different communication systems satisfy a regulatory requirement set by the countries or regions on the spectrum, the communication devices may use the spectrum, and may not apply for a dedicated spectrum license to a government.

In order to allow various communication systems that use the unlicensed spectrum for wireless communication to coexist friendly on the spectrum, some countries or regions have stipulated the regulatory requirement that must be met when using the unlicensed spectrum. For example, the communication device follows a principle of LBT. That is, the communication device needs to perform channel listening first, before performing a signal transmission on a channel of the unlicensed spectrum. Only when a result of channel listening is that the channel is idle, the communication device can perform the signal transmission. If the result of channel listening performed by the communication device on the unlicensed spectrum is that the channel is busy, the communication device cannot perform the signal transmission. In order to ensure fairness, in one transmission, duration of the signal transmission performed by the communication device using the channel of the unlicensed spectrum cannot exceed a Maximum Channel Occupancy Time (MCOT).

1. Channel Access Scheme

There may be the following four types of channel access schemes when the communication device performs LBT, where a bandwidth of LBT may be 20 MHz, or integer times of 20 MHz.

Category 1 (Cat-1 LBT): transmission is immediately performed after a switching gap ends
being suitable for a transmission switching within one Channel Occupancy Time (COT)
the switching gap not exceeding a particular time length, such as 16 µs Category 2 (Cat-2 LBT): a single time slot detection, also referred as LBT without random backoff
if a channel is idle in a single detection time, signal transmission may be performed; and if the channel is occupied, signal transmission cannot be performed
a time length of a single time slot detection may be different under the switching gaps with different time lengths, for example, the time length of the single time slot detection may be greater than 16 µs and less than or equal to 25 µs Category 3 (Cat-3 LBT): LBT with random backoff based on a fixed Contention Window Size (CWS)

Category 4 (Cat-4 LBT): LBT with random backoff based on a variable CWS

Optionally, Cat-3 LBT and Cat-4 LBT further differentiate between priorities of the channel access schemes according to priorities of the transmission services.

2. Basic Concepts of Signal Transmission on an Unlicensed Spectrum

Maximum Channel Occupancy Time (MCOT): a MCOT refers to the maximum time length in which a channel of an unlicensed spectrum is allowed to be used to perform signal transmission after LBT succeeds, and there are different MCOTs under different channel access priorities. Optionally, the MCOT is the time occupied by signal transmission.

Channel Occupancy Time (COT): a COT refers to a time length in which signal transmission is performed by using a channel of an unlicensed spectrum after LBT succeeds, and channels occupied by signals in the time length may be inconsecutive. Optionally, one COT may not exceed 20 ms at most, and the time length occupied by signal transmission within the COT does not exceed MCOT.

gNB's Channel Occupancy Time (gNB-initiated COT): a gNB's channel occupancy time is also referred as a gNB-initiated COT, and refers to one channel occupancy time obtained by a gNB after LBT succeeds. In addition to being used for a downlink transmission, the gNB's channel occupancy time may also be used by UE to perform an uplink transmission when a certain condition is satisfied.

UE's Channel Occupancy Time (UE-initiated COT): a UE's channel occupancy time is also referred as a UE-initiated COT, and refers to one channel occupancy time obtained by UE after LBT succeeds.

Downlink transmission opportunity (DL burst): a downlink transmission opportunity (DL burst) refers to a group of downlink transmissions (that is, including one or more downlink transmissions) performed by a gNB. The group of downlink transmissions is continuous transmission (that is, there is no gap between a plurality of downlink transmissions, or a downlink time unit included in one DL burst is continuous). If there is a gap between two downlink transmissions performed by the gNB, it is considered that the two downlink transmissions belong to two DL bursts. Optionally, one downlink transmission refers to one PDSCH.

Uplink transmission opportunity (UL burst): an uplink transmission opportunity (UL burst) refers to a group of uplink transmissions (that is, including one or more uplink transmissions) performed by one UE. The group of uplink transmissions is continuous transmission (that is, there is no gap between a plurality of uplink transmissions, or an uplink time unit included in one UL burst is continuous). If there is a gap between two uplink transmissions performed by the UE, it is considered that the two uplink transmissions belong to two UL bursts. Optionally, one uplink transmission refers to one PUSCH.

3. Application Scenarios of Channel Access Scheme

Channel access schemes applied to different transmission scenarios are different, and channel access schemes applied to different signals or channels are also different.

Figure 2:
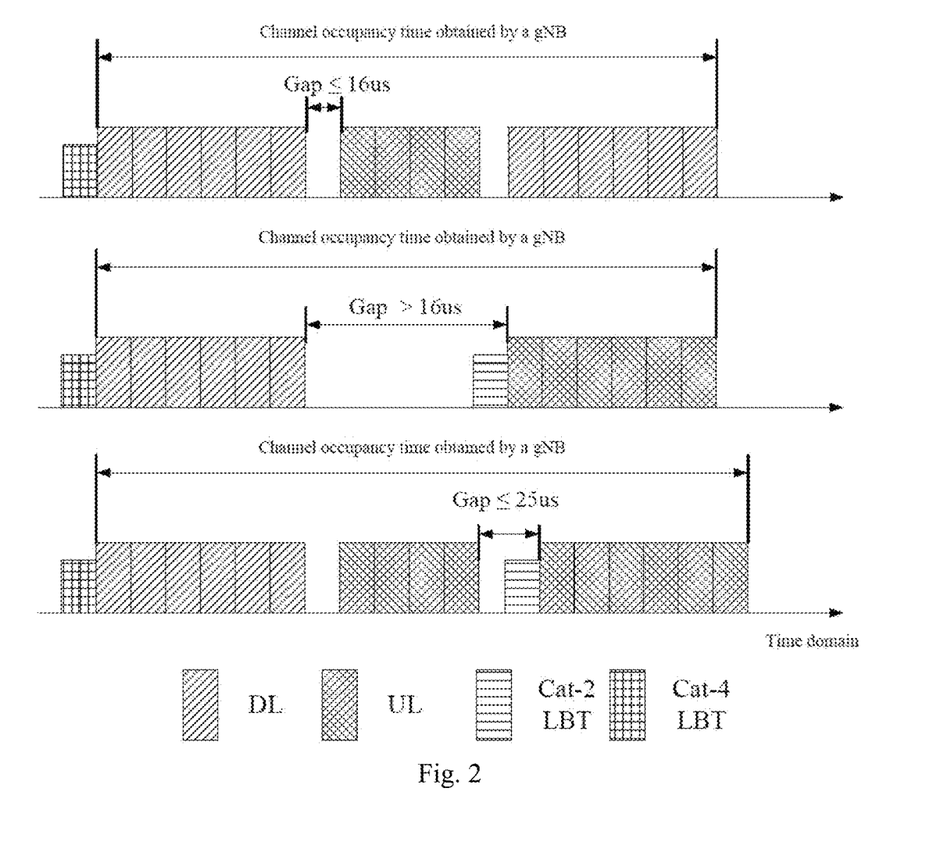
FIG. 2 is a schematic diagram of LBT provided by an embodiment of the present application.

For example, referring to FIG. 2, after a gNB initiates a COT, a resource in the COT may be used by UE to perform an uplink transmission. For an UL burst occurring within the COT of the gNB, if a gap between a starting position of the UL burst and an ending position of the DL burst is less than or equal to a preset value such as 16 µs, the UE may immediately perform the uplink transmission. If no DL burst follows the UL burst in the COT of the gNB, the UE may perform Cat-2 LBT (in other words, a single time slot detection) before transmission. If the gap between any two times of adjacent transmissions in the COT of the gNB is less than or equal to 25 µs, the UE may perform Cat-2 LBT (in other words, the single time slot detection). FIG. 2 takes the COT initiated by the gNB as an example, and the COT initiated by the UE has the same principle and will not be repeated.

4. Time Mask

Between continuous transmission symbols or time slots, the power is brought to be turned off, i.e., a transient period (also referred to as transient time or time mask or transient period), due to a power change or Resource Block (RB) hopping. However, symbols or sub-slots occupied by the transient period may lead to increased demodulation errors due to an unstable power condition. If the proportion of symbols or sub-slots occupied by the transient period is relatively large, transmission may not be required.

The unlicensed spectrum needs to successfully complete LBT before transmission in order to obtain the uplink or downlink transmission opportunity. When each transmission starts or ends, it is also necessary to define and satisfy a requirement of the time mask. However, since the acquisition of the transmission opportunity brought by the success of LBT and the start timing of the transmission are relatively random, and also there is a certain flexibility in the time within the LBT window, if the corresponding time mask designs may be adopted for these different situations, the transmission opportunity of slots or symbols after LBT may be flexibly improved, and the time mask off time transient performance of a terminal or a gNB may be ensured.

In the prior art, a communication device (a terminal device or a network device) on the unlicensed spectrum needs to perform LBT before transmission, so the transient period/time mask may only start after LBT. If the uplink transmission of the terminal device occurs within the COT of the gNB, and the gap between the start timing of the uplink transmission of the terminal device and the end timing of the latest transmission thereof is less than or equal to a preset value (for example, 16 µs), the terminal device may directly perform the uplink transmission without LBT. In this case, if the corresponding time mask designs may be adopted for these different situations, the transmission opportunity of uplink slots or symbols may be flexibly improved, and the time mask off time transient performance of the terminal device may be ensured. Correspondingly, if the downlink transmission of the gNB occurs within the COT of the terminal device, and the gap between the start timing of the downlink transmission of the gNB and the end timing of the latest transmission thereof is less than or equal to the preset value (for example, 16 µs), the time mask of the gNB may also have the same design.

For LBT cat-1, the gap between two transmissions is less than or equal to 16 µs, that is, the gap between two transmissions is a variable length, and the variable length has an opportunity to be used for the communication device to power on in advance. Therefore, for the position of the transient period, the following technical solutions of the embodiments of the present application are proposed to realize flexible turning off powers of different unlicensed devices (the terminal device and the network device), reduce the impact of the transient period on actual transmitted symbols, and improve transmission reliability and decoding success rate.

Figure 3:
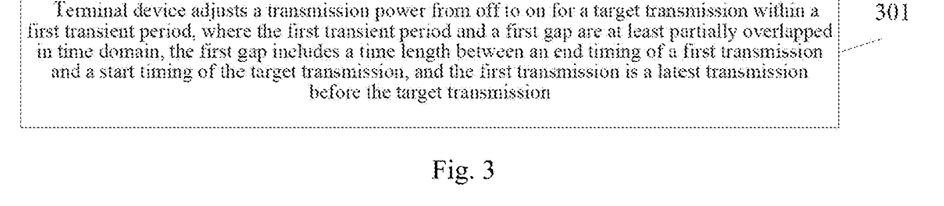
FIG. 3 is a first schematic flowchart of a power adjustment method for an unlicensed spectrum provided by an embodiment of the present application.

FIG. 3 is a first schematic flowchart of a power adjustment method for an unlicensed spectrum provided by an embodiment of the present application. As shown in FIG. 3, the power adjustment method for the unlicensed spectrum includes the following steps.

Step 301: a terminal device adjusts a transmission power from off to on for a target transmission within a first transient period, where the first transient period and a first gap are at least partially overlapped in time domain, the first gap includes a time length between an end timing of a first transmission and a start timing of the target transmission, and the first transmission is a latest transmission before the target transmission.

Optionally, the technical solutions in the embodiments of the present application are applied to the unlicensed spectrum. For the target transmission on the unlicensed spectrum, at least one of the following situations is satisfied: 1) the terminal device does not need to perform channel listening before the target transmission starts; or, 2) the length of the first gap is less than or equal to a third preset value, the first gap includes the time length between the end timing of the first transmission and the start timing of the target transmission, and the first transmission is the latest transmission before the target transmission.

Specifically, the terminal device does not need to perform LBT before the target transmission starts, in other words, the first gap between the start timing of the target transmission and the end timing of the latest transmission is less than or equal to the third preset value (for example, 16 μs). It should be understood that the length of the first gap may be a variable length, for example, and the length of the first gap is greater than or equal to 0 μs and less than or equal to 16 μs.

In the embodiments of the present application, for the terminal device, the target transmission is a target uplink transmission or a target sidelink transmission.

In the embodiments of the present application, under the premise that the target transmission meets the above situations, the first transient period may occupy a time domain resource of the first gap, that is, the first transient period and the first gap are at least partially overlapped in time domain, where the terminal device adjusts the transmission power from off to on for the target transmission within the first transient period. The start timing of the first transient period and the end timing of the first transient period are described below, respectively.

The start timing of the first transient period

Optionally, the starting timing of the first transient period is within the first gap. In other words, the first transient period starts within the first gap.

Optionally, the starting timing of the first transient period is the same as the starting timing of the first gap.

The end timing of the first transient period

Optionally, the end timing of the first transient period is within the first gap. In other words, the first transient period completes a power ramp within the first gap.

Optionally, the end timing of the first transient period is the same as an end timing of the first gap.

It should be noted that the technical solutions in the embodiments of the present application may only determine the start timing of the first transient period, so as to determine the position of the first transient period. It is also possible to only determine the end timing of the first transient period, so as to determine the position of the first transient period. It is also possible to determine the start timing of the first transient period and the end timing of the first transient period at the same time, so as to determine the position of the first transient period. Taking determining the start timing of the first transient period and the end timing of the first transient period at the same time as an example, the start timing of the first transient period is within the first gap, and the end timing of the first transient period is within the first gap. It can be seen that the first transient period is within the first gap. In other words, the terminal device completes the power ramp from off to on within the first gap.

In the embodiments of the present application, the first transient period and the first gap are at least partially overlapped in the time domain, and how the first transient period and the first gap are overlapped is described below in detail.

Optionally, the first gap is greater than or equal to the first transient period, and the first transient period and the first gap are completely overlapped in the time domain.

In this overlapping manner, a time domain resource of the first gap covers (contains) a time domain resource of the first transient period. In other words, the first transient period is located in the first gap.

In this overlapping manner, the start timing of the first transient period is within the first gap, or the start timing of the first transient period is the same as a start timing of the first gap. Moreover, the end timing of the first transient period is within the first gap, or the end timing of the first transient period is the same as the end timing of the first gap.

Figure 4A:
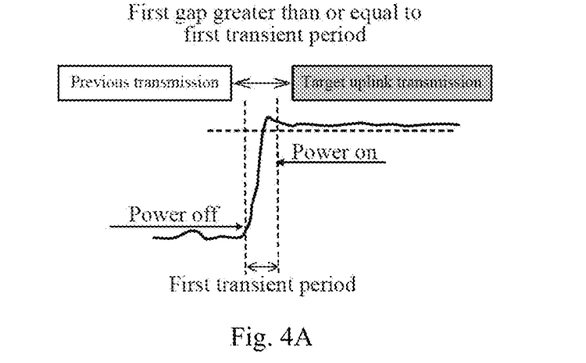
FIG. 4A is a first schematic diagram of a first transient period provided by an embodiment of the present application.

Taking FIG. 4A as an example, the first gap is greater than or equal to the first transient period, and the start timing and the end timing of the first transient period are both within the first gap (that is, the first transient period is located in the first gap). The target uplink transmission may be any uplink channel transmission and/or uplink signal transmission.

Optionally, the first gap is less than or equal to the first transient period, and the first transient period and the target transmission are at least partially overlapped in the time domain.

In an optional embodiment, a part of the time domain resource of the first transient period is overlapped with the time domain resource of the first gap, and another part of the time domain resource of the first transient period is overlapped with the time domain resource of the target transmission. The terminal device occupies a part of the time domain resource transmitted by the terminal device to complete the adjustment of the transmission power from off to on.

Optionally, the start timing of the first transient period is within the first gap; or the start timing of the first transient period is the same as the start timing of the first gap.

For example: the length of the first transient period is Z, $Z=X+Y$, where X is located in the first gap, Y is located in the time of the target transmission, X is greater than or equal to 0 μs, and Y is greater than or equal to 0 μs.

Figure 4B:
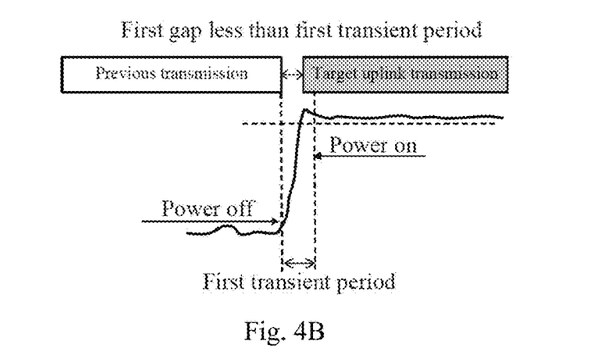
FIG. 4B is a second schematic diagram of a first transient period provided by an embodiment of the present application.

Taking FIG. 4B as an example, the first gap is less than the first transient period, the start timing of the first transient period is the same as the start timing of the first gap, a part of the time domain resource of the first transient period is overlapped with the time domain resource of the first gap, and another part of the time domain resource of the first transient period is overlapped with the time domain resource of the target transmission. The target transmission may be any uplink channel transmission and/or uplink signal transmission.

Optionally, a time domain resource occupied by the target transmission is greater than or equal to a first preset value (for example, 3 symbols). Here, since the time domain resource of the first transient period is overlapped with the time domain resource of the target transmission, the target transmission may be impacted. Thus, a relatively larger time domain resource occupied by the target transmission may reduce this impact.

Optionally, the target transmission includes at least two Sounding Reference Signal (SRS) symbols, and transmission powers of the at least two SRS symbols are the same.

Figure 4C:
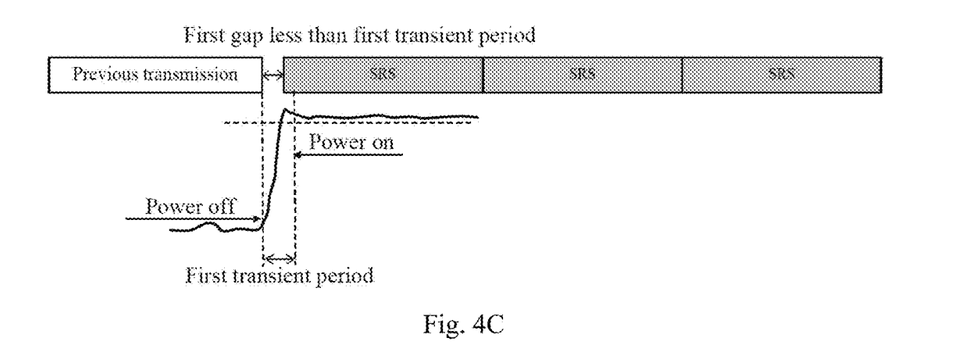
FIG. 4C is a third schematic diagram of a first transient period provided by an embodiment of the present application.

Taking FIG. 4C as an example, the first gap is less than the first transient period, the start timing of the first transient period is the same as the start timing of the first gap, a part of the time domain resource of the first transient period is overlapped with the time domain resource of the first gap, and another part of the time domain resource of the first transient period is overlapped with the time domain resource of the target transmission. The target transmission includes 3 SRS symbols with the same transmission power.

Optionally, the first gap is less than or equal to the first transient period, and the first transient period and the first transmission are at least partially overlapped in the time domain.

In an optional embodiment, a part of the time domain resource of the first transient period is overlapped with the time domain resource of the first gap, and another part of the time domain resource of the first transient period is overlapped with the time domain resource of the first transmission. The terminal device occupies a part of the time domain resource of a previous transmission to complete the adjustment of the transmission power from off to on.

Optionally, the end timing of the first transient period is within the first gap; or the end timing of the first transient period is the same as the end timing of the first gap.

Here, since the time domain resource of the first transient period and the time domain resource of the target transmission are not overlapped, the target transmission may not be impacted. Therefore, optionally, the target transmission may be any target uplink transmission or target sidelink transmission.

Optionally, the time domain resource occupied by the target transmission is less than or equal to a second preset value (such as 2 symbols).

Optionally, the target transmission includes at least one of following situations:
  a Physical Random Access Channel (PRACH);
  N1 SRS symbols, where N1 has a value of a positive integer less than or equal to 3;
  N2 Physical Uplink Control Channel (PUCCH) symbols, where N2 has a value of a positive integer less than or equal to 3;
  N3 Physical Uplink Shared Channel (PUSCH) symbols, where N3 has a value of a positive integer less than or equal to 3; and
  N4 Physical Sidelink Shared Channel (PSSCH) symbols, where N4 has a value of a positive integer less than or equal to 3.

Here, the values of N1, N2, N3 and N4 may be the same, partially the same, or completely different.

Figure 4D:
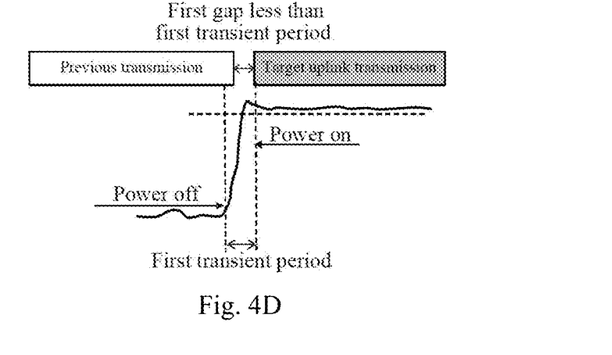
FIG. 4D is a fourth schematic diagram of a first transient period provided by an embodiment of the present application.

Taking FIG. 4D as an example, the first gap is less than the first transient period, the end timing of the first transient period is the same as the end timing of the first gap, a part of the time domain resource of the first transient period is overlapped with the time domain resource of the first gap, and another part of the time domain resource of the first transient period is overlapped with the time domain resource of the first transmission. The target transmission is PRACH, or 1 SRS symbol, or 1 or 2 PUCCH symbols, or 1 or 2 PUSCH symbols, or 1 or 2 PSSCH symbols.

Optionally, the target transmission includes at least two SRS symbols, and transmission powers of two adjacent SRS symbols in the at least two SRS symbols are different, where a second transient period is included between the two adjacent SRS symbols with different transmission powers, and the terminal device adjusts the transmission powers of the SRS symbols within the second transient period, where the second transient period occupies a time domain resource included in each of the two adjacent SRS symbols in an evenly divided or proportional manner.

Figure 4E:
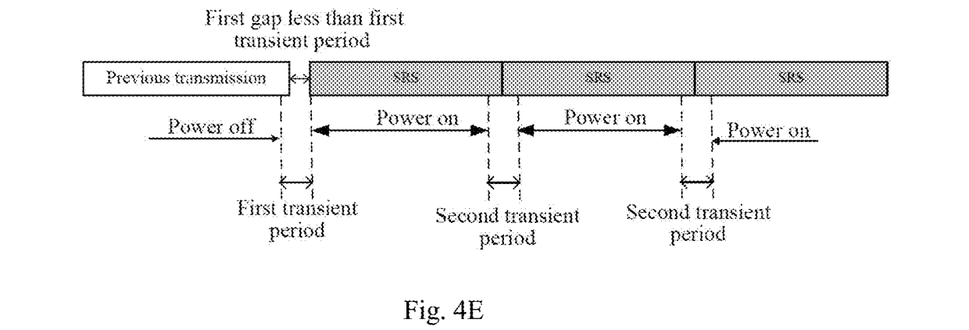
FIG. 4E is a fifth schematic diagram of a first transient period provided by an embodiment of the present application.

Taking FIG. 4E as an example, the first gap is less than the first transient period, the end timing of the first transient period is the same as the end timing of the first gap, a part of the time domain resource of the first transient period is overlapped with the time domain resource of the first gap, and another part of the time domain resource of the first transient period is overlapped with the time domain resource of the first transmission. The target transmission includes 3 SRS symbols, the transmit powers of adjacent SRS symbols are different, the second transient period is included between two adjacent SRS symbols, and the second transient period occupies the time domain resource included in each of the two adjacent SRS symbols in the evenly divided or proportional manner.

In one embodiment of the present application, the latest transmission (i.e. the first transmission) before the target transmission may be a downlink transmission, an uplink transmission of another terminal device, or a sidelink transmission of another terminal.

In one embodiment of the present application, the start timing of the target transmission may be a symbol boundary or a time slot boundary, or may be a timing within a symbol or a time slot.

In one embodiment of the present application, the length of the first transient period is less than or equal to 20 μs. Optionally, the first transient period has a value of 20 us or 10 μs.

In one embodiment of the present application, the length of the first transient period is determined according to the worst terminal device capability. For example, the length of the first transient period is 10 μs, the terminal device adjusts the power from off to on within the first transient period, and the actual time for the terminal device to adjust the power from off to on is less than or equal to 10 μs.

In one embodiment of the present application, different subcarrier intervals correspond to different lengths of the first transient period.

Figure 5:
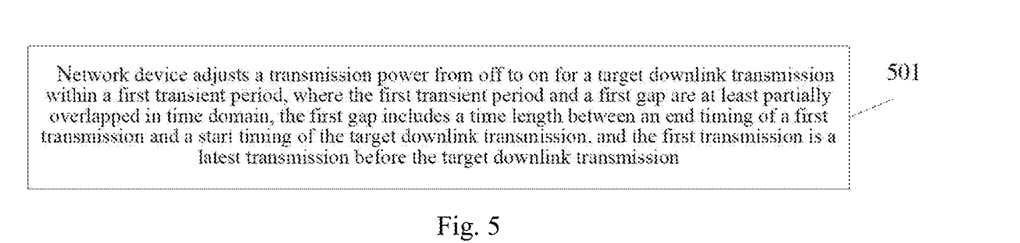
FIG. 5 is a second schematic flowchart of a power adjustment method for an unlicensed spectrum provided by an embodiment of the present application.

FIG. 5 is a second schematic flowchart of a power adjustment method for an unlicensed spectrum provided by an embodiment of the present application. As shown in FIG. 5, the power adjustment method for the unlicensed spectrum includes the following steps.

Step 501: a network device adjusts a transmission power from off to on for a target downlink transmission within a first transient period, where the first transient period and a first gap are at least partially overlapped in time domain, the first gap includes a time length between an end timing of a first transmission and a start timing of the target downlink transmission, and the first transmission is a latest transmission before the target downlink transmission.

In the embodiment of the present application, the network device may be a gNB, such as an NR gNB, or an LTE gNB, etc.

The technical solutions in the embodiments of the present application are applied to the unlicensed spectrum. For the target downlink transmission on the unlicensed spectrum, at least one of the following situations is satisfied: 1) the network device does not need to perform channel listening before the target downlink transmission starts; or, 2) the length of the first gap is less than or equal to a third preset value, the first gap includes the time length between the end timing of the first transmission and the start timing of the target downlink transmission, and the first transmission is the latest transmission before the target downlink transmission.

Specifically, the network device does not need to perform LBT before the target downlink transmission starts, in other words, the first gap between the start timing of the target downlink transmission and the end timing of the latest transmission is less than or equal to the third preset value (for example, 16 μs). It should be understood that the length of the first gap may be a variable length, for example, and the length of the first gap is greater than or equal to 0 µs and less than or equal to 16 µs.

In the embodiments of the present application, under the premise that the target downlink transmission meets the above situations, the first transient period may occupy a time domain resource of the first gap, that is, the first transient period and the first gap are at least partially overlapped in time domain, where the network device adjusts the transmission power from off to on for the target downlink transmission within the first transient period. The start timing of the first transient period and the end timing of the first transient period are described below, respectively.

The start timing of the first transient period

Optionally, the starting timing of the first transient period is within the first gap. In other words, the first transient period starts within the first gap.

Optionally, the starting timing of the first transient period is the same as the starting timing of the first gap.

The end timing of the first transient period

Optionally, the end timing of the first transient period is within the first gap. In other words, the first transient period completes a power ramp within the first gap.

Optionally, the end timing of the first transient period is the same as an end timing of the first gap.

It should be noted that the technical solutions of the embodiments of the present application may only determine the start timing of the first transient period, so as to determine the position of the first transient period. It is also possible to only determine the end timing of the first transient period, so as to determine the position of the first transient period. It is also possible to determine the start timing of the first transient period and the end timing of the first transient period at the same time, so as to determine the position of the first transient period. Taking determining the start timing of the first transient period and the end timing of the first transient period at the same time as an example, the start timing of the first transient period is within the first gap, and the end timing of the first transient period is within the first gap. It can be seen that the first transient period is within the first gap. In other words, the network device completes the power ramp from off to on within the first gap.

In the embodiments of the present application, a first transient period and a first gap are at least partially overlapped in time domain, and how the first transient period and the first gap are overlapped is described below in detail.

Optionally, the first gap is greater than or equal to the first transient period, and the first transient period and the first gap are completely overlapped in the time domain.

In this overlapping manner, a time domain resource of the first gap covers (contains) a time domain resource of the first transient period. In other words, the first transient period is located in the first gap.

In this overlapping manner, the start timing of the first transient period is within the first gap, or the start timing of the first transient period is the same as a start timing of the first gap. Moreover, the end timing of the first transient period is within the first gap, or the end timing of the first transient period is the same as the end timing of the first gap.

Figure 6A:
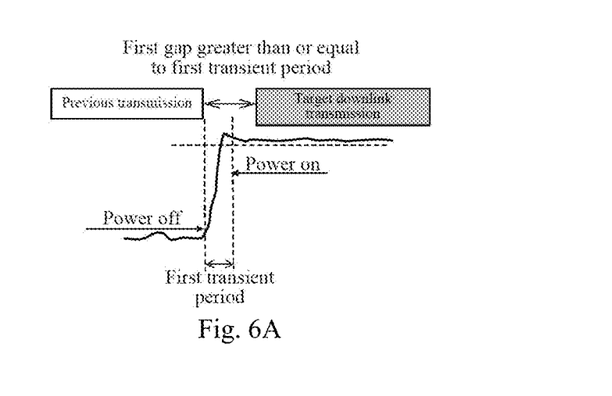
FIG. 6A is a sixth schematic diagram of a first transient period provided by an embodiment of the present application.

Taking FIG. 6A as an example, the first gap is greater than or equal to the first transient period, and the start timing and the end timing of the first transient period are both within the first gap, and the first transient period is located in the first gap. The target downlink transmission may be any downlink channel transmission and/or downlink signal transmission.

Optionally, the first gap is less than or equal to the first transient period, and the first transient period and the target downlink transmission are at least partially overlapped in the time domain.

In this overlapping manner, a part of the time domain resource of the first transient period is overlapped with the time domain resource of the first gap, and another part of the time domain resource of the first transient period is overlapped with the time domain resource of the target downlink transmission. The network device occupies a part of the time domain resource transmitted by the network device to complete the adjustment of the transmission power from off to on.

In this overlapping manner, the start timing of the first transient period is within the first gap; or the start timing of the first transient period is the same as the start timing of the first gap.

For example: the length of the first transient period is Z, Z=X+Y, where X is located in the first gap, Y is located in the time of the target downlink transmission, X is greater than or equal to 0 µs, and Y is greater than or equal to 0 µs.

Figure 6B:
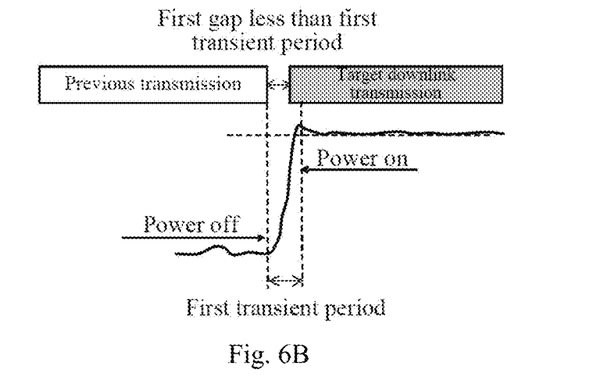
FIG. 6B is a seventh schematic diagram of a first transient period provided by an embodiment of the present application.

Taking FIG. 6B as an example, the first gap is less than the first transient period, the start timing of the first transient period is the same as the start timing of the first gap, a part of the time domain resource of the first transient period is overlapped with the time domain resource of the first gap, and another part of the time domain resource of the first transient period is overlapped with the time domain resource of the target downlink transmission. The target downlink transmission may be any downlink channel transmission and/or downlink signal transmission.

Optionally, the first gap is less than or equal to the first transient period, and the first transient period and the first transmission are at least partially overlapped in time domain.

In this overlapping manner, a part of the time domain resource of the first transient period is overlapped with the time domain resource of the first gap, and another part of the time domain resource of the first transient period is overlapped with the time domain resource of the first transmission. The network device occupies a part of the time domain resource of a previous transmission to complete the adjustment of the transmission power from off to on.

In this overlapping manner, the end timing of the first transient period is within the first gap; or the end timing of the first transient period is the same as the end timing of the first gap.

It should be understood that in this overlapping manner, when the previous transmission is an uplink transmission, the network device may not completely receive all the signals in the previous transmission, so the performance of the previous transmission will be affected. Therefore, this overlapping manner may be used for a very important downlink signal/channel transmission. Optionally, the target downlink transmission includes a Synchronizing Signal/PBCH Block (SSB).

Optionally, the target downlink transmission may be any downlink channel transmission and/or downlink signal transmission.

Figure 6C:
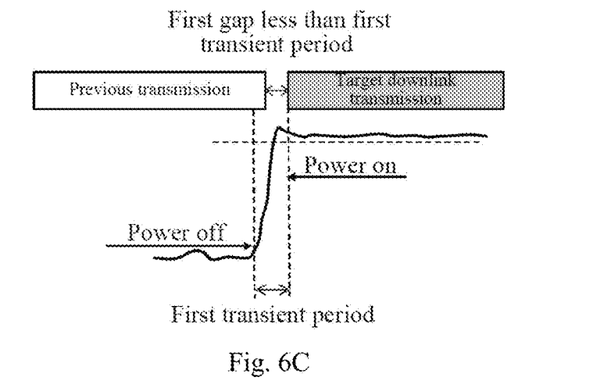
FIG. 6C is an eighth schematic diagram of a first transient period provided by an embodiment of the present application.

Taking FIG. 6C as an example, the first gap is less than the first transient period, the end timing of the first transient period is the same as the end timing of the first gap, a part of the time domain resource of the first transient period is overlapped with the time domain resource of the first gap, and another part of the time domain resource of the first transient period is overlapped with the time domain resource of the first transmission.

In one embodiment of the present application, the latest transmission (i.e., the first transmission) before the target downlink transmission may be an uplink transmission of a terminal or a sidelink transmission of a terminal.

In one embodiment of the present application, the start timing of the target downlink transmission may be a symbol boundary or a time slot boundary, or may be a timing within a symbol or a time slot.

In one embodiment of the present application, a length of the first transient period is less than or equal to 20 μs. Optionally, the first transient period has a value of 17 μs or 10 μs.

In one embodiment of the present application, the length of the first transient period is determined according to the worst network device capability. For example, the length of the first transient period is 10 μs, the network device adjusts the power from off to on within this first transient period, and the actual time for the network device to adjust the power from off to on is less than or equal to 10 μs.

In one embodiment of the present application, different subcarrier intervals correspond to different lengths of the first transition period.

Figure 7:
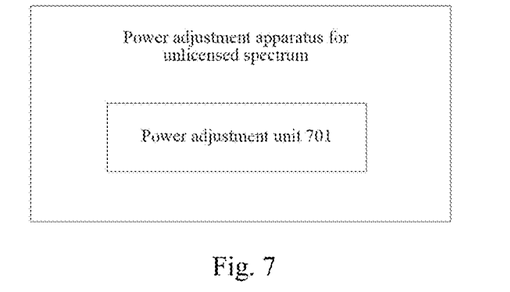
FIG. 7 is a first schematic diagram of a structural composition of a power adjustment apparatus for an unlicensed spectrum provided by an embodiment of the present application.

FIG. 7 is a first schematic diagram of a structural composition of a power adjustment apparatus for an unlicensed spectrum provided by an embodiment of the present application, wherein the power adjustment apparatus is applied to a terminal device. As shown in FIG. 7, the power adjustment apparatus for the unlicensed spectrum includes:

a power adjustment unit 701, configured to adjust a transmission power from off to on for a target transmission within a first transient period, where the first transient period and a first gap are at least partially overlapped in time domain, the first gap includes a time length between an end timing of a first transmission and a start timing of the target transmission, and the first transmission is a latest transmission before the target transmission.

In an embodiment, the first transient period and the first gap being at least partially overlapped in the time domain includes:

a start timing of the first transient period being within the first gap; or the start timing of the first transient period being the same as a start timing of the first gap.

In an embodiment, the first transient period and the first gap being at least partially overlapped in the time domain includes:

an end timing of the first transient period being within the first gap; or the end timing of the first transient period being the same as an end timing of first gap.

In an embodiment, the first gap is greater than or equal to the first transient period.

In an embodiment, the first transient period and the first gap being at least partially overlapped in the time domain includes:

the first transient period and the first gap being completely overlapped in the time domain.

In an embodiment, the first gap is less than or equal to the first transient period, and the first transient period and the target transmission are at least partially overlapped in the time domain.

In an embodiment, a time domain resource occupied by the target transmission is greater than or equal to a first preset value.

In an embodiment, the target transmission includes at least two SRS symbols, and transmission powers of the at least two SRS symbols are the same.

In an embodiment, the first gap is less than or equal to the first transient period, and the first transient period and the first transmission are at least partially overlapped in the time domain.

In an embodiment, a time domain resource occupied by the target transmission is less than or equal to a second preset value.

In an embodiment, the target transmission includes at least one of following situations:

a PRACH;

N1 SRS symbols, where N1 has a value of a positive integer less than or equal to 3;

N2 PUCCH symbols, where N2 has a value of a positive integer less than or equal to 3;

N3 PUSCH symbols, where N3 has a value of a positive integer less than or equal to 3; and N4 PSSCH symbols, where N4 has a value of a positive integer less than or equal to 3.

In an embodiment, the target transmission includes at least two SRS symbols, and transmission powers of two adjacent SRS symbols in the at least two SRS symbols are different.

In an embodiment, a second transient period is included between the two adjacent SRS symbols with different transmission powers, and the terminal device adjusts the transmission powers of the SRS symbols within the second transient period, where the second transient period occupies a time domain resource included in each of the two adjacent SRS symbols in an evenly divided or proportional manner.

In an embodiment, the first transmission is a downlink transmission, an uplink transmission, or a sidelink transmission.

In an embodiment, a length of the first gap is less than or equal to a third preset value; or the terminal device does not perform channel listening before the target transmission starts.

It should be understood by those skilled in the art that the relevant description of the above power adjustment apparatus for the unlicensed spectrum in the embodiment of the application can be understood with reference to the relevant description of the power adjustment method for the unlicensed spectrum in the embodiment of the application.

Figure 8:
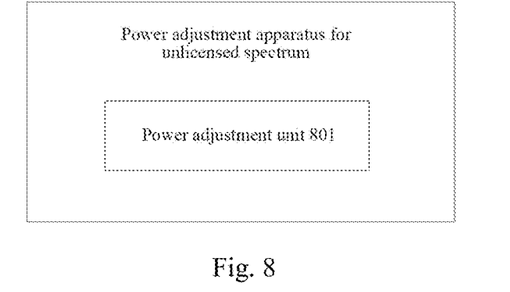
FIG. 8 is a second schematic diagram of a structural composition of a power adjustment apparatus for an unlicensed spectrum provided by an embodiment of the present application.

FIG. 8 is a second schematic diagram of a structural composition of a power adjustment apparatus for an unlicensed spectrum provided by an embodiment of the present application, wherein the power adjustment apparatus is applied to a network device. As shown in FIG. 8, the power adjustment apparatus for the unlicensed spectrum includes:

a power adjustment unit 801, configured to adjust a transmission power from off to on for a target downlink transmission within a first transient period, where the first transient period and a first gap are at least partially overlapped in time domain, the first gap includes a time length between an end timing of a first transmission and a start timing of the target downlink transmission, and the first transmission is a latest transmission before the target downlink transmission.

In an embodiment, the first transient period and the first gap being at least partially overlapped in the time domain includes:

a start timing of the first transient period being within the first gap; or the start timing of the first transient period being the same as a start timing of the first gap.

In an embodiment, the first transient period and the first gap being at least partially overlapped in the time domain includes:

an end timing of the first transient period being within the first gap; or the end timing of the first transient period being the same as a start timing of the first gap.

In an embodiment, the first gap is greater than or equal to the first transient period, and the first transient period and the first gap are completely overlapped in the time domain.

In an embodiment, the first gap is less than or equal to the first transient period, and the first transient period and the target downlink transmission are at least partially overlapped in the time domain.

In an embodiment, the first gap is less than or equal to the first transient period, and the first transient period and the first transmission are at least partially overlapped in the time domain.

In an embodiment, the target downlink transmission includes an SSB.

In an embodiment, the first transmission is an uplink transmission or a sidelink transmission.

In an embodiment, a length of the first gap is less than or equal to a third preset value; or the network device does not perform channel listening before the target downlink transmission starts.

It should be understood by those skilled in the art that the relevant description of the above power adjustment apparatus for the unlicensed spectrum in the embodiment of the application can be understood with reference to the relevant description of the power adjustment method for the unlicensed spectrum in the embodiment of the application.

Figure 9:
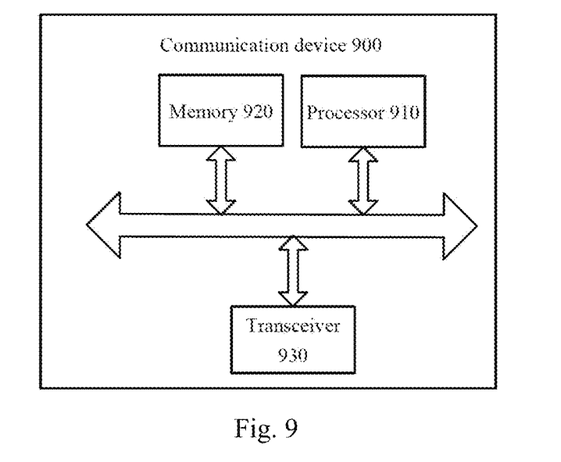
FIG. 9 is a schematic structural diagram of a communication device provided by an embodiment of the present application.

FIG. 9 is a schematic structural diagram of a communication device 900 provided by an embodiment of the present application. The communication device may be a terminal device or a network device. The communication device 900 shown in FIG. 9 includes a processor 910, and the processor 910 may call and run a computer program from a memory to implement the method in the embodiment of the present application.

Optionally, as shown in FIG. 9, the communication device 900 may further include a memory 920. Wherein the processor 910 may call and run a computer program from the memory 920 to implement the method in the embodiment of the present application.

The memory 920 may be a separate component independent of the processor 910, or may be integrated in the processor 910.

Optionally, as shown in FIG. 9, the communication device 900 may further include a transceiver 930. The processor 910 may control the transceiver 930 to communicate with other devices. Specifically, the transceiver may send information or data to other devices, or receive information or data sent by other devices.

The transceiver 930 may include a transmitter and a receiver. The transceiver 930 may further include an antenna, and the number of the antenna may be one or more.

Optionally, the communication device 900 may specifically be the network device of the embodiments of the present application, and the communication device 900 may implement the corresponding process implemented by the network device in each method of the embodiments of the present application, which will not be described here again for brevity.

Optionally, the communication device 900 may specifically be the mobile terminal/terminal device of the embodiments of the present application, and the communication device 900 may implement the corresponding process implemented by the mobile terminal/terminal device in each method of the embodiments of the present application, which will not be described here again for brevity.

Figure 10:
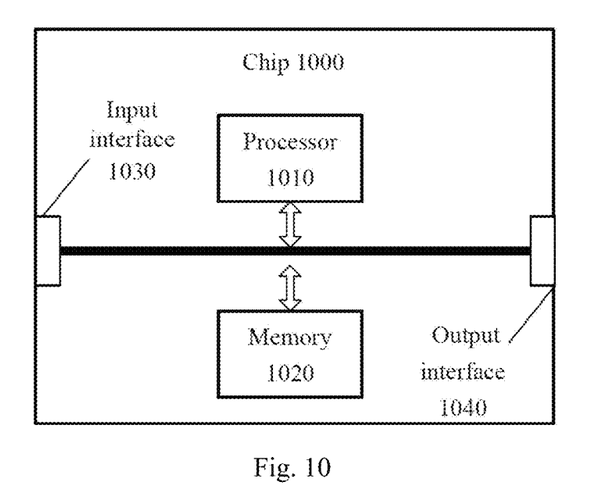
FIG. 10 is a schematic structural diagram of a chip of an embodiment of the present application.

FIG. 10 is a schematic structural diagram of a chip of an embodiment of the present application. The chip 1000 shown in FIG. 10 includes a processor 1010, and the processor 1010 can call and run a computer program from a memory to implement the method in the embodiments of the present application.

Optionally, as shown in FIG. 10, the chip 1000 may also include a memory 1020, where the processor 1010 may call and run a computer program from the memory 1020 to implement the method in the embodiments of the present application.

The memory 1020 may be a separate part independent of the processor 1010, and may also be integrated in the processor 1010.

Optionally, the chip 1000 may also include an input interface 1030, where the processor 1010 may control the input interface 1030 to communicate with other devices or chips, and specifically, may obtain information or data sent by other devices or chips.

Optionally, the chip 1000 may also include an output interface 1040, where the processor 1010 may control the output interface 1040 to communicate with other devices or chips, and specifically, may send information or data to other devices or chips.

Optionally, the chip may be applied to the network device in the embodiments of the present application, and the chip may implement the corresponding process implemented by the network device in each method of the embodiments of the present application, which will not be described here again for brevity.

Optionally, the chip may be applied to the mobile terminal/terminal device in the embodiments of the present application, and the chip may implement the corresponding process implemented by the mobile terminal/terminal device in each method of the embodiments of the present application, which will not be described here again for brevity.

It should be understood that the chip mentioned in the embodiments of the present application may also be referred to as a system level chip, a system chip, a chip system or a system-on-chip chip, etc.

Figure 11:
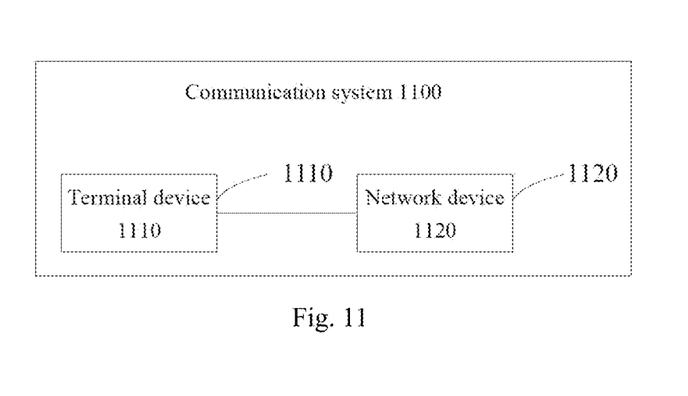
FIG. 11 is a schematic block diagram of a communication system provided by an embodiment of the present application.

FIG. 11 is a schematic block diagram of a communication system 1100 provided by an embodiment of the present application. As shown in FIG. 11, the communication system 1100 includes a terminal device 1110 and a network device 1120.

The terminal device 1110 may be used to implement the corresponding function implemented by the terminal device in the above method, and the network device 1120 may implement the corresponding function implemented by the network device in the above method, which will not be described here again for brevity.

It should be understood that the processor of the embodiments of the present application may be an integrated circuit chip with signal processing capability. In the implementation process, each step of the above method embodiments may be completed by hard ware integrated logic circuits in the processor or instructions in the form of software. The above processor may be a general-purpose processor, a digital signal processor (DSP), an application specific integrated circuit (ASIC), a field programmable gate array (FPGA), or another programmable logic device, discrete gate or transistor logic device, or discrete hardware component. Each method, step and logic block diagram disclosed in the embodiments of the present application may be implemented or executed. The general-purpose processor may be a microprocessor, or the processor may also be any conventional processor or the like. The steps of the method disclosed in combination with the embodiments of the present application may be directly embodied as being executed by a hardware decoding processor, or by a combination of hardware and software modules in the decoding processor. The software module may be located in a mature storage medium of the art, such as a random access memory, a flash memory, a read-only memory, a programmable read-only memory or an electrically erasable programmable memory, a register, etc. The storage medium is located in the memory, and the processor reads information in the memory and completes the steps of the above method in combination with its hardware.

It can be understood that the memory in the embodiments of the present application may be a volatile memory or a non-volatile memory, or may include both volatile and non-volatile memories. The non-volatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM) which serves as an external cache. By way of exemplary but not limitative description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch link DRAM (SLDRAM) and a Direct Rambus RAM (DR RAM). It should be noted that the memories of the system and method described herein are intended to include, but are not limited to, these and any other suitable types of memories.

It should be understood that the above memory is exemplary but not limited restrictive. For example, the memory of the embodiments of the present application may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a Direct Rambus RAM (DR RAM), etc. That is to say, the memories of the embodiments of the present application are intended to include, but are not limited to, these and any other suitable types of memories.

An embodiment of the present application also provides a computer-readable storage medium configured to store a computer program.

Optionally, the computer-readable storage medium may be applied to the network device in the embodiments of the present application, and the computer program causes the computer to perform the corresponding process implemented by the network device in each method of the embodiments of the present application, which will not be described here again for brevity.

Optionally, the computer-readable storage medium may be applied to the mobile terminal/terminal device in the embodiments of the present application, and the computer program causes the computer to perform the corresponding process implemented by the mobile terminal/terminal device in each method of the embodiments of the present application, which will not be described here again for brevity.

An embodiment of the present application also provides a computer program product including a computer program instruction.

Optionally, the computer program product may be applied to the network device in the embodiments of the present application, and the computer program instruction causes a computer to perform the corresponding process implemented by the network device in each method of the embodiments of the present application, which will not be described here again for brevity.

Optionally, the computer program product may be applied to the mobile terminal/terminal device in the embodiments of the present application, and the computer program instruction causes the computer to perform the corresponding process implemented by the mobile terminal/terminal device in each method of the embodiments of the present application, which will not be described here again for brevity.

An embodiment of the present application also provides a computer program.

Optionally, the computer program may be applied to the network device in the embodiments of the present application, and when the computer program runs on a computer, the computer is caused to perform the corresponding process implemented by the network device in each method of the embodiments of the present application, which will not be described here again for brevity.

Optionally, the computer program may be applied to the mobile terminal/terminal device in the embodiments of the present application, and when the computer program runs on the computer, the computer is caused to perform the corresponding process implemented by the mobile terminal/terminal device in each method of the embodiments of the present application, which will not be described here again for brevity.

Those of ordinary skill in the art can be aware that the unit and algorithm step of each example described in conjunction with the embodiments disclosed herein may be implemented by electronic hardware, or a combination of computer software and electronic hardware. Whether these functions are executed in the form of hardware or software depends on the specific applications and design constraints of the technical solutions. Professionals and technicians may use different methods for each specific application to implement the described function, but such implementation should not be considered beyond the scope of the present application.

Those skilled in the art can clearly understand that, for the convenience and conciseness of the description, the specific working process of the system, apparatus and unit described above may refer to the corresponding process in the aforementioned method embodiments, which will not be described here again.

In the several embodiments provided by the present application, it should be understood that the disclosed system, apparatus and method may be implemented in other manners. For example, the apparatus embodiment described above is merely exemplary. For example, the division of the units is merely one kind of logical function division, and there may be other division manners in actual implementation. For example, multiple units or components may be combined or integrated in another system, or some features may be ignored or not executed. On the other hand, the mutual coupling or direct coupling or communication connection shown or discussed may be indirect coupling or communication connection through some interfaces, apparatus or units, and may be in electrical, mechanical or other forms.

The units described as separate components may or may not be physically separated, and the components displayed as units may or may not be physical units, that is, they may be located in one place, or may be distributed on multiple network units. Some or all of the units may be selected according to actual needs to achieve the objectives of the solutions of the embodiments.

In addition, each functional unit in each embodiment of the present application may be integrated in one processing unit, or each unit may exist alone physically, or two or more above units may be integrated in one unit.

The functions may be stored in a computer-readable storage medium if being implemented in a form of a software functional unit and sold or used as an independent product. Based on such understanding, the essence of the technical solutions of the present application or the part contributing to the prior art or part of the technical solutions may be embodied in the form of a software product, and the computer software product is stored in a storage medium including several instructions such that a computer device (which may be a personal computer, a server, or a network device, etc.) executes all or part of the steps of the method described in each embodiment of the present application. The aforementioned storage medium includes: various mediums that can store program codes, such as a USB flash disk, a mobile hard disk, a read-only memory (ROM), a random access memory (RAM), a magnetic disk, an optical disk, or the like.

The foregoing descriptions are merely specific implementations of the embodiments of the present application, and the protection scope of the embodiments of the present application is not limited thereto. Any person skilled in the art can easily think of changes or substitutions within the technical scope disclosed in the present application, and all the changes or substitutions should be covered in the protection scope of the present application. Therefore, the protection scope of the present application should be subject to the protection scope of the claims.

What is claimed is:

1. A power adjustment method for an unlicensed spectrum, the method comprising:
adjusting, by a terminal device, a transmission power from off to on for a target transmission within a first transient period, wherein the first transient period and a first gap are at least partially overlapped in time domain, the first gap comprises a time length between an end timing of a first transmission and a start timing of the target transmission, and the first transmission is a latest transmission before the target transmission,
wherein the first gap is less than or equal to the first transient period, and the first transient period and the target transmission are at least partially overlapped in the time domain,
wherein the target transmission comprises at least two Sounding Reference Signal (SRS) symbols, and transmission powers of the at least two SRS symbols are the same.

2. The method according to claim 1, wherein the first transient period and the first gap being at least partially overlapped in the time domain comprises:
a start timing of the first transient period being within the first gap; or
the start timing of the first transient period being the same as a start timing of the first gap.

3. The method according to claim 1, wherein the first transient period and the first gap being at least partially overlapped in the time domain comprises:
an end timing of the first transient period being within the first gap; or
the end timing of the first transient period being the same as an end timing of first gap.

4. The method according to claim 1, wherein the first transient period and the first gap being at least partially overlapped in the time domain comprises:
the first transient period and the first gap being completely overlapped in the time domain.

5. The method according to claim 1, wherein a time domain resource occupied by the target transmission is greater than or equal to a first preset value.

6. The method according to claim 1, wherein the first transient period and the first transmission are at least partially overlapped in the time domain.

7. The method according to claim 6, wherein a time domain resource occupied by the target transmission is less than or equal to a second preset value.

8. A power adjustment apparatus for an unlicensed spectrum, applied to a terminal device, the apparatus comprising:
a memory; and
a processor, wherein the memory is configured to store a computer program, and the processor is configured to call and run the computer program stored in the memory to:
adjust a transmission power from off to on for a target transmission within a first transient period, wherein the first transient period and a first gap are at least partially overlapped in time domain, the first gap comprises a time length between an end timing of a first transmission and a start timing of the target transmission, and the first transmission is a latest transmission before the target transmission,
wherein the first gap is less than or equal to the first transient period, and the first transient period and the target transmission are at least partially overlapped in the time domain,
wherein the target transmission comprises at least two SRS symbols, and transmission powers of the at least two SRS symbols are the same.

9. The apparatus according to claim 8, wherein the first transient period and the first gap being at least partially overlapped in the time domain comprises:
a start timing of the first transient period being within the first gap; or
the start timing of the first transient period being the same as a start timing of the first gap.

10. The apparatus according to claim 8, wherein the first transient period and the first gap being at least partially overlapped in the time domain comprises:
an end timing of the first transient period being within the first gap; or
the end timing of the first transient period being the same as an end timing of first gap.

11. The apparatus according to claim 8, wherein the first transient period and the first gap being at least partially overlapped in the time domain comprises:
the first transient period and the first gap being completely overlapped in the time domain.

12. The apparatus according to claim 8, wherein a time domain resource occupied by the target transmission is greater than or equal to a first preset value.

13. The apparatus according to claim 8, wherein the first transient period and the first transmission are at least partially overlapped in the time domain.

14. The apparatus according to claim 13, wherein a time domain resource occupied by the target transmission is less than or equal to a second preset value.

* * * * *